United States Patent
Stime, Jr.

(10) Patent No.: US 7,610,878 B2
(45) Date of Patent: Nov. 3, 2009

(54) AQUARIUM FOR JELLYFISH

(76) Inventor: James Boyd Stime, Jr., 2925 Calle Quebracho, Thousand Oaks, CA (US) 91360

(*) Notice: Subject to any disclaimer, the term of this patent is extended or adjusted under 35 U.S.C. 154(b) by 272 days.

(21) Appl. No.: 11/416,721

(22) Filed: May 3, 2006

(65) Prior Publication Data

US 2007/0056523 A1    Mar. 15, 2007

Related U.S. Application Data

(60) Provisional application No. 60/717,015, filed on Sep. 14, 2005.

(51) Int. Cl.
*A01K 63/00* (2006.01)
(52) U.S. Cl. ...................... 119/251; 119/245
(58) Field of Classification Search .................. 119/245, 119/259, 226, 251
See application file for complete search history.

(56) References Cited

U.S. PATENT DOCUMENTS

| | | | |
|---|---|---|---|
| 4,966,096 A * | 10/1990 | Adey ........................... | 119/226 |
| 4,988,436 A | 1/1991 | Cole | |
| 5,054,424 A | 10/1991 | Sy | |
| 5,084,164 A | 1/1992 | Del Rosario | |
| D327,233 S | 6/1992 | McClellan | |
| 5,174,239 A | 12/1992 | Sato | |
| D340,550 S | 10/1993 | Teats | |
| 5,299,424 A | 4/1994 | Woodson et al. | |
| D373,693 S | 9/1996 | Elhage | |
| 5,865,141 A | 2/1999 | Poynter et al. | |
| 5,970,918 A | 10/1999 | Bargy | |

(Continued)

FOREIGN PATENT DOCUMENTS

JP    H10-98977 A    4/1998

(Continued)

OTHER PUBLICATIONS

"Planktonkreisel design from the article: Capture and rearing techniques for gelatinous zooplankton, (2003) Biological Bulletin, 204, 68-80, by K. A. Raskoff, F.A. Sommer, W. M. Hamner and K. M. Cross", website: http://www.mbari.org/midwater/tank/tank.htm, 4 pages, printed from the Internet on May 2, 2006.

(Continued)

*Primary Examiner*—Michael R Mansen
*Assistant Examiner*—Monica L Williams
(74) *Attorney, Agent, or Firm*—Chen Yoshimura LLP

(57) ABSTRACT

An aquarium for jellyfish and other plankton species is described. The aquarium has a water container formed by two vertical front facets and a side surface between the front facets, the container having a polygonal, round or other shape when viewed from the front. A sealed chamber is located adjacent the water container with a water inlet that provides water to the chamber. A diffuser block provides a water passage from the sealed chamber to the water container. The diffuser block has a plurality of parallel channels so that water entering the container from the sealed chamber forms a plurality of jet streams along the side surface. This creates a laminar flow of water inside the water container near the side surface, which helps to keep the jellyfish suspended. The water container also has a discharge port covered with a screen to prevent the jellyfish from being sucked out.

14 Claims, 4 Drawing Sheets

U.S. PATENT DOCUMENTS

| | | | |
|---|---|---|---|
| 6,044,903 A * | 4/2000 | Heilman et al. | 165/263 |
| 6,067,937 A | 5/2000 | Boschert | |
| D449,717 S | 10/2001 | Fang | |
| D451,249 S | 11/2001 | Fang | |
| 6,641,732 B1 * | 11/2003 | Cheyne | 210/615 |
| 7,029,577 B2 * | 4/2006 | Cummins | 210/167.31 |
| 2004/0103853 A1 | 6/2004 | Anusasananunta | |

FOREIGN PATENT DOCUMENTS

| | | |
|---|---|---|
| JP | H11-318269 A | 11/1999 |
| WO | 03/022041 A1 | 3/2003 |

OTHER PUBLICATIONS

"Jellyfish Tanks", by Envision Acrylics, website: http://www.envisionacrylics.com/jellyfish.html, 2 pages, printed from the Internet on May 2, 2006.

* cited by examiner

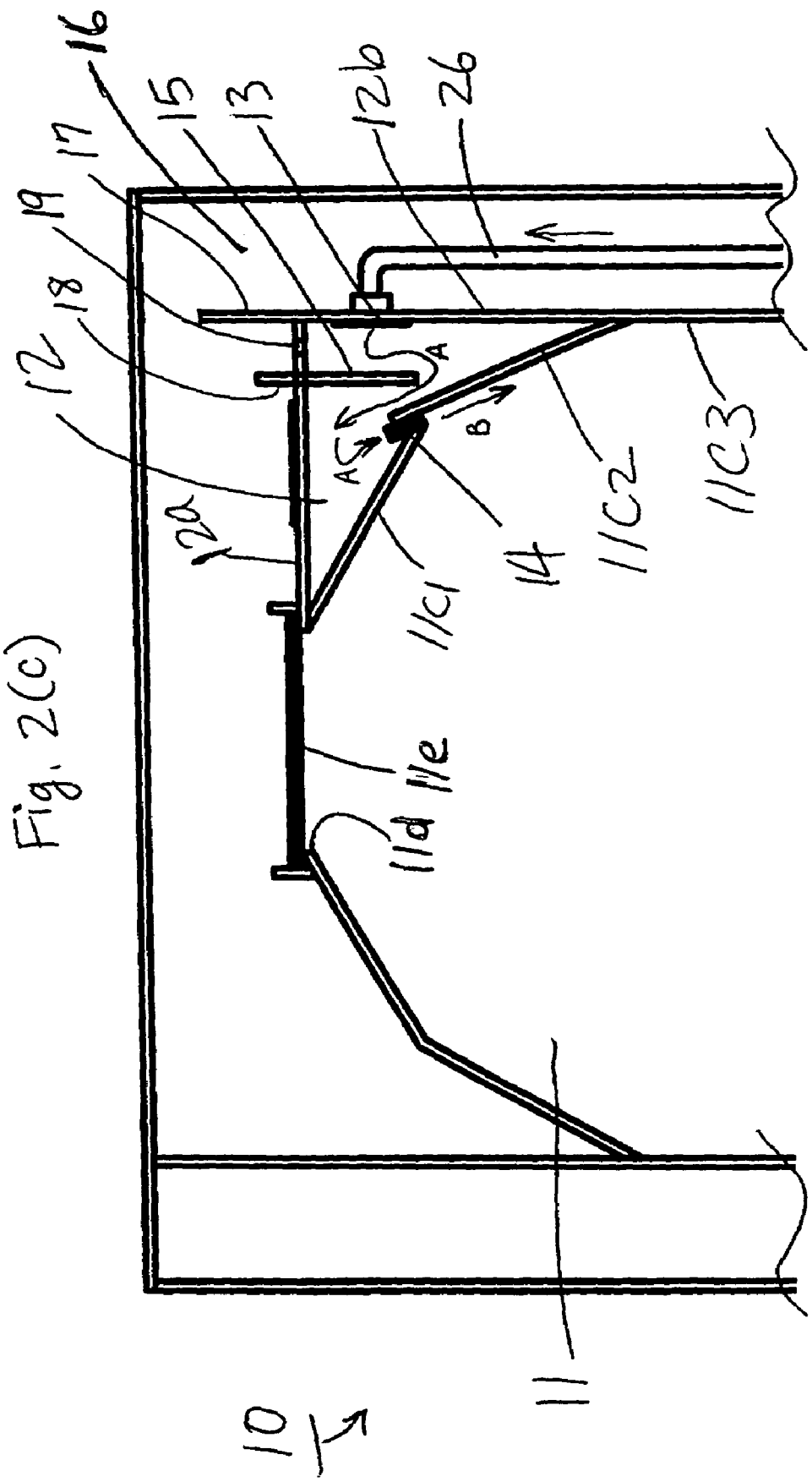

AQUARIUM FOR JELLYFISH

This application claims priority under 35 U.S.C. §119(e) from U.S. Provisional Patent Application No. 60/717,015, filed Sep. 14, 2005.

BACKGROUND OF THE INVENTION

1. Field of the Invention

This invention relates to aquarium, and in particular, it relates to an aquarium suitable for keeping and displaying jellyfish and other plankton species.

2. Description of the Related Art

Aquariums or water tanks suitable for keeping and displaying jellyfish and other plankton species have been known. These aquariums require special designs as jellyfish are delicate. Some such aquarium designs are described in: (1) Japanese Patent Publication H10-234250, (2) webpage description at http://www.mbari.org/midwater/tank/tank.htm, entitled: "Planktonkreisel design from the article: Capture and rearing techniques for gelatinous zooplankton, (2003) Biological Bulletin, 204, 68-80, by K. A. Raskoff, F. A. Sommer, W. M. Hamner and K. M. Cross," and (3) webpage description at http://www.envisionacrylics.com/jellyfish.html, entitled "Jellyfish Tanks", by Envision Acrylics. Such aquariums are designed to provide a living environment suitable for jellyfish and other plankton species, including providing water circulation inside the tank and using a discharge port that prevents the plankton bodies from being damaged by the water flow from the discharge port.

SUMMARY OF THE INVENTION

The present invention is directed to an aquarium suitable for keeping and displaying jellyfish and other plankton species.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a water tank for an aquarium suitable for keeping jellyfish and other plankton life, which includes: a water container having a generally cylindrical shape with two parallel front facets and a side surface, a sealed chamber having a water inlet, and a diffuser providing a water passage from the sealed chamber to the water container, the diffuser having a plurality of parallel channels disposed along the side surface of the water container.

In another aspect, the present invention provides an aquarium system suitable for keeping jellyfish and other plankton life, which includes: a water tank, a water pump, a refrigeration unit, a water filter, and a foam fractionator, wherein the water pump, the refrigeration unit, the water filter and the foam fractionator are connected in series and connected to the discharge port and the inlet of the water tank by a drain and a return line, respectively. The water tank includes an inlet, a discharge port, a water container having a generally cylindrical shape with two parallel front panels and a side surface, a sealed chamber connected to the inlet, and a diffuser providing a water passage from the sealed chamber to the water container, the diffuser having a plurality of parallel channels disposed along the side surface of the water container.

It is to be understood that both the foregoing general description and the following detailed description are exemplary and explanatory and are intended to provide further explanation of the invention as claimed.

BRIEF DESCRIPTION OF THE DRAWINGS

FIGS. 2(a)-(c) illustrate the water tank of the aquarium system of FIG. 1.

DETAILED DESCRIPTION OF THE PREFERRED EMBODIMENTS

Figure 1:
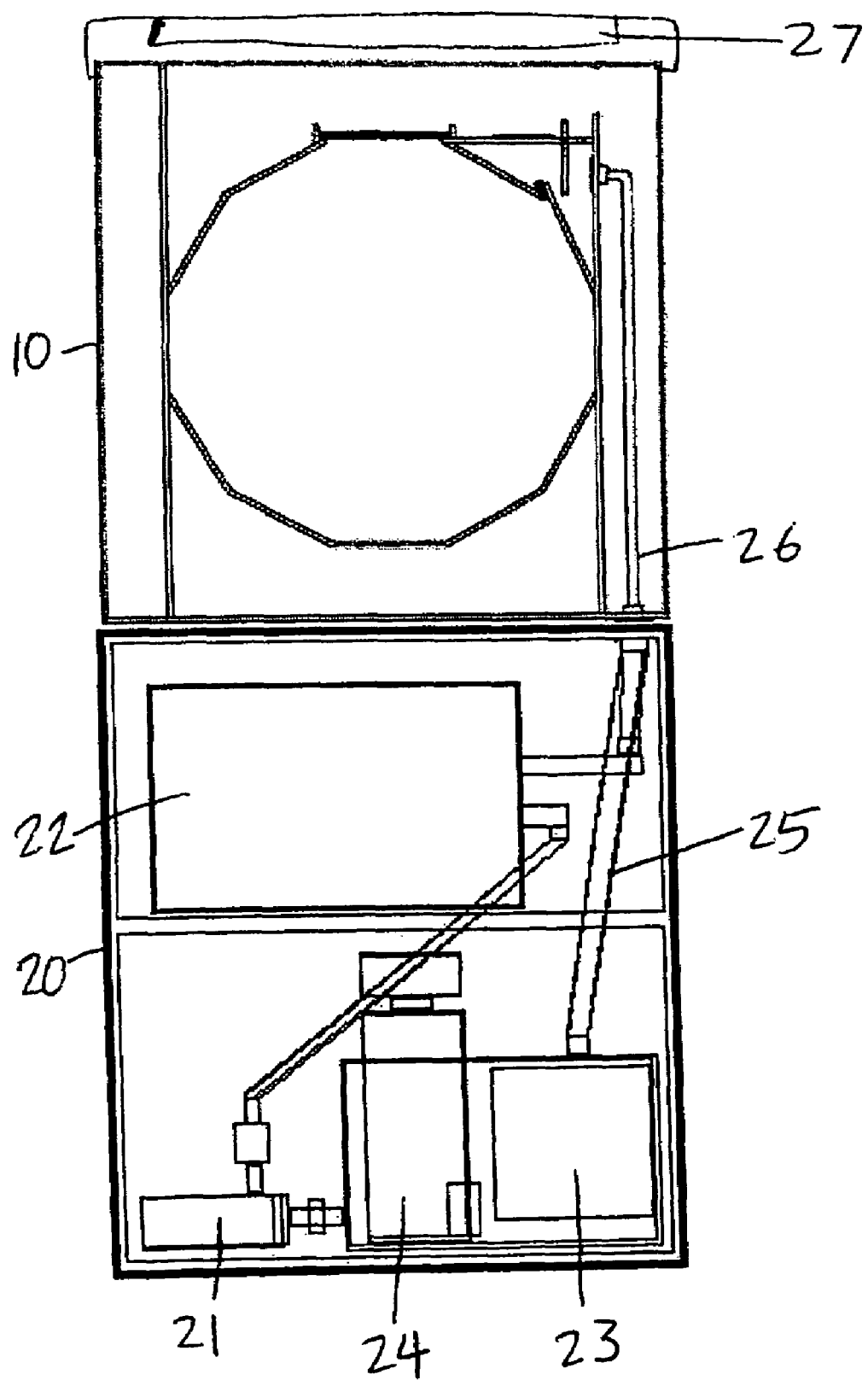
FIG. 1 shows an aquarium system according to an embodiment of the present invention.

FIG. 1 shows a free standing, self-contained aquarium system according to an embodiment of the present invention. The aquarium system 1 includes a water tank 10 and a stand 20 that houses a water pump 21, a refrigeration unit 22, a water filter (also referred to as a wet-dry trickle filter) 23, and a protein skimmer (also referred to as a foam fractionator) 24. A flexible drain line (hose) 25 connects a discharge port (not shown in FIG. 1) of the tank to the water filter 23, and a return line 26 connects the refrigeration unit 22 to a water inlet 13 (see FIG. 2(c)) of the tank for returning clean water to the tank. Under the action of the water pump 21, discharged water from the tank circulates through the water filter 23, the protein skimmer 24 and the chiller unit 22 and is returned to the tank. The aquarium system 1 may also include a fluorescent light 27. The components 21, 22, 23, 24, and 27 are typical for aquarium systems.

Figure 2B:
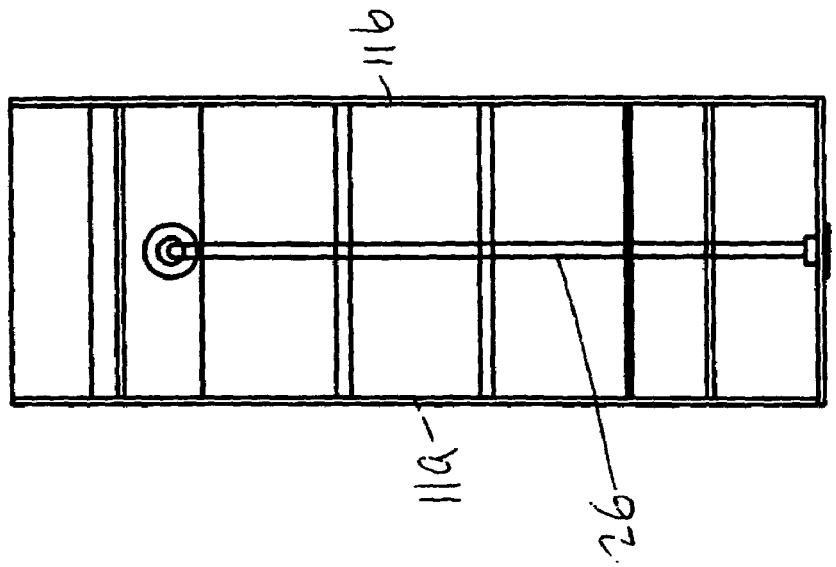
Figure 2A:
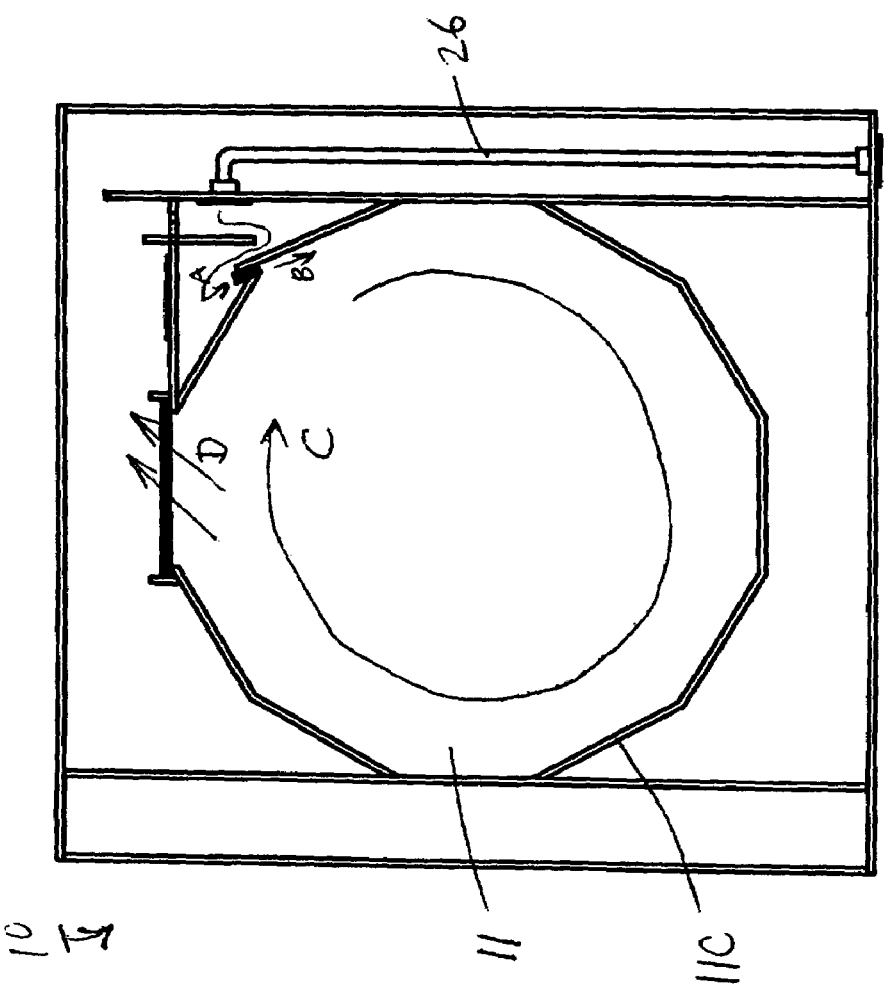

FIGS. 2(a)-(b) are drawings showing the front and side views of the water tank 10, respectively. FIG. 2(c) is an enlarged view of the upper portion of the tank shown in FIG. 2(a). The water container 11 of the tank has a polygonal shape when viewed from the front, and is formed by two parallel flat front panels 11a and 11b, and a plurality of flat side panels 11c disposed perpendicular to the front panels 11a and 11b. The various panels may be made of glass, plastic (such as acrylic material), or other suitable materials. The plurality of side panels may be individual flat pieces joined together, or made of one or more pieces of material formed into the appropriate shapes. Although the container 11 illustrated in FIG. 2(a) forms a 12-sided polygon, the container may have other number of sides. Alternatively, the container may have a round, oval, or other curved or partially curved shapes when viewed from the front. The container 11 may be generally described as a cylinder (having either a polygonal, curved or partially curved cross-section) standing on its side, having two parallel, vertical front surfaces (front facets) and a side surface between the two front facets. The depth of the container (the distance between the two front facets) is typically smaller than a linear dimension of the cross-section of the cylinder.

A sealed chamber 12 is provided at a corner of the tank 10 adjacent the water container 11. In the embodiment illustrated in FIG. 2(a), the sealed chamber 12 is formed by the two front panels 11a and 11b, two side panels 11c1 and 11c2 of the container 11, and two additional panels 12a and 12b disposed perpendicular to the front panels. The panel 12b may be an extension of a side panel 11c3. A water inlet 13 is situated on the panel 12b and connected to the return line 26 to inject water into the sealed chamber 12. A baffle (a blocking wall)

Figure 3B:
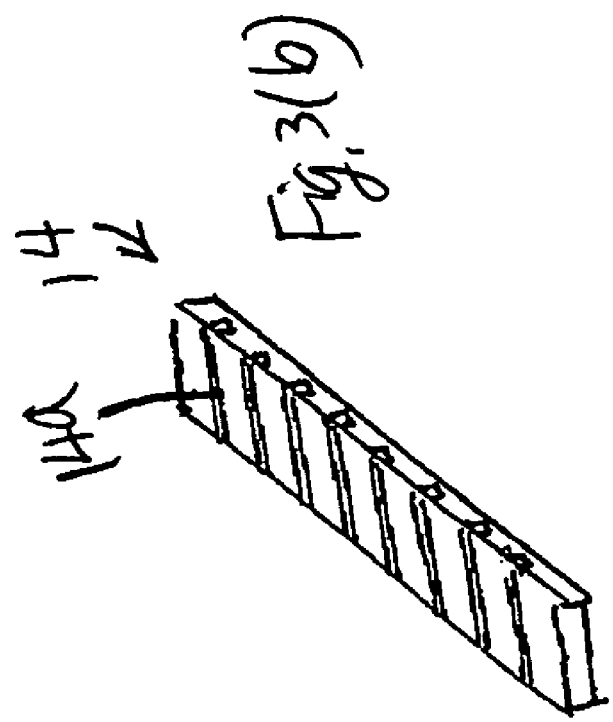
FIGS. 3(a)-(b) illustrate the diffuser of the water tank of FIGS. 2(a)-(c).
Figure 3A:
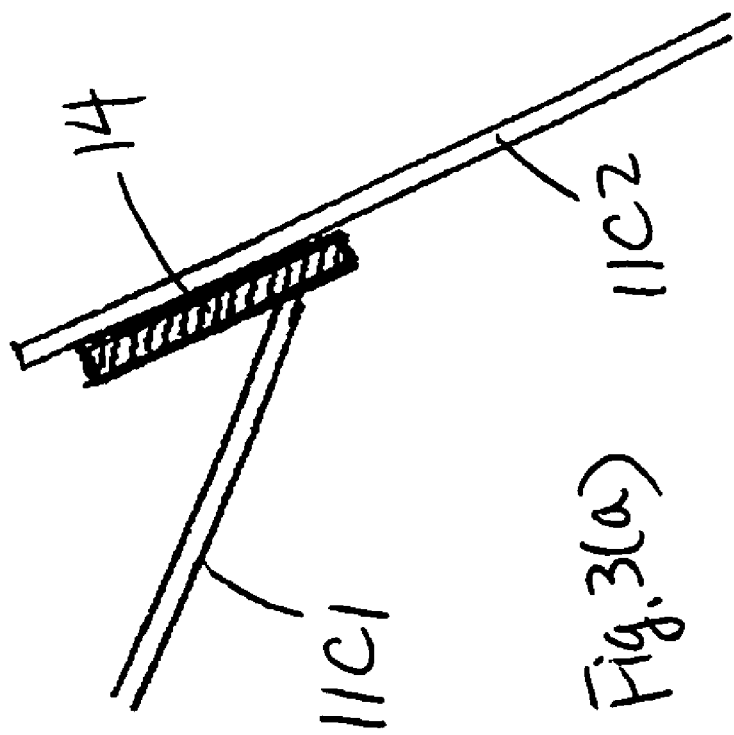

15 is disposed in front of the inlet 13 to block and spread out the water stream from the inlet 13. A diffuser 14 disposed in a gap between the two side panels 11c1 and 11c2 provides a passage for water from the sealed chamber 12 to the container 11. As illustrated in FIG. 3(b), the diffuser 14 is a rectangular block with a plurality of parallel channels 14a formed on a surface thereof. Each channel 14a extends in a width-wise direction of the block 14 across the entire block, and the plurality of channels are distributed in the length-wise direction of the block preferably at regular intervals over the entire length of the block. As shown in FIG. 3(a), the diffuser 14 is disposed along the side panel 11c2 with the channels 14a abutting the panel 11c2, the length-wise direction of the diffuser being in the depth-wise direction of the container, and an edge of the panel 11c1 pushing against the diffuser block. Preferably, the block 14 has a length such that it spans the entire depth of the container 11.

In operation, water in the sealed chamber 12 moves from the inlet 13 to the diffuser 14 in a general direction indicated by the arrow A in FIG. 2(a). The baffle 15 blocks the stream of water from the inlet 13, spreading it out equally thus creating a substantially evenly distributed flow of water within the sealed chamber. This makes the water flow in the vicinity of the diffuser 14 more even. The water enters the container 11 through the diffuser block 14 in the form of a plurality of parallel jet streams moving along the panel 11c2 as indicated by the arrow B. This minimizes the direct push or damage on the jellyfish by the water that enters the container. It is believed that the multiple jets help create a laminar flow of water that circulates inside the container along its side surface as indicated by the arrow C. The circular flow of water near the side surface keeps the jellyfish suspended in the center portion of the container (i.e. the portion away from the side surface) and minimizes the risk of the jellyfish contacting, or becoming damaged by contacting, the side surface.

The diffuser 14 may have other shapes or constructions than that shown in FIGS. 3(a)-(b), so long as it is capable of creating a plurality of jet streams along a side surface of the water container 11. Generally, longer lengths of the channels 14a in the diffuser help create more stable jet streams and therefore more stable laminar flow inside the container. The shape and construction of the sealed chamber 12 may also vary from those shown in FIG. 2(a), so long as it allows the diffuser 14 to be properly situated so that water enters the container 11 as jet streams along the side surface thereof. Although one vertical baffle 15 is shown in FIG. 2(c), a baffle in other orientation and location or additional baffles may be provided to achieve the function of diffusing and spreading out the water stream from the inlet 13.

A dirty water exit port 11d is provided at the top of the container 11. Water leaves the container 11 as indicated by arrows D in FIG. 2(a). The exit port is covered with a screen or grid 11e to prevent the jellyfish and other plankton life from flowing out of the exit port. The screen 11e also makes the flow of water leaving the container more diffused. In the embodiment illustrated in FIG. 2(a), the exit port/screen is the size of an entire side panel, but the exit port may be smaller or larger than that shown. A first riser 17 that extends the entire depth of the tank is provided in an area above the exit port 11d to create, together with the two front panels 11a and 11b, a space for the discharged water above the exit port 11d. In the embodiment illustrated in FIGS. 2(a) and 2(c), the riser 17 may be an extension of the panel 12b. The discharged water rises behind the riser 17 and spills over it, thus allowing the organic pollutants that have collected at the waters surface to spill into an overflow chamber 16 and drained by the drain line 25. Optionally, another riser (not shown in the drawings) may be provided to the left of the exit port 11d to prevent the discharged water from filling the triangular space to the left of the exit port.

Optionally, a second riser 18, also extending the entire depth of the tank but lower than the first riser 17, may be provided between the first riser 17 and the exit port 11d. The first riser 17 and second riser 18 create a trough that is open at its top. One or more small holes 19 are drilled into its horizontal base of the trough to connect the trough to the sealed chamber 12. The function of the trough is to prevent back-siphoning by the water filtration system through the inlet 13 when power is turned off. When the power is turned off, this back-siphoning will quickly drain the trough of water and then draw air into the chamber 12, through the small holes 19. Air will be drawn into the inlet 13, which will break the back-siphon and stop any further water in the tank from draining backwards. It is noted here that the chamber 12 may be referred to as a sealed chamber even though small holes 19 or other small openings exit. The chamber 12 is considered to be "sealed" in that it ensures that during normal operation, water from the inlet 13 is forced into the tank through the diffuser 14.

The water container 11 may different sizes, and the water pump used may vary according to the size of the container. In one example, the water container is approximately 50 gallons and a water pump that generates a maximum of 540 GPH with a maximum pressure of 50 PSI is used. A hand valve (referred to as a gate valve) is provided in this system so that depending on the size and number of jellyfish in the tank, the water flow can be adjusted to obtain an appropriate amount of circulation within the tank so as to keep the various jellyfish gently suspended. The appropriate amount of water flow can be determined empirically so the flow is neither too strong nor too weak and damage to the jellyfish is avoided.

Aquariums according to embodiments of the present invention create a suitable environment for the jellyfish and other plankton life in the tank. Compared to some other known designs, aquariums according to embodiments of the present invention have a simpler design and are easier and less costly to build.

It will be apparent to those skilled in the art that various modification and variations can be made in the aquarium system of the present invention without departing from the spirit or scope of the invention. Thus, it is intended that the present invention cover modifications and variations that come within the scope of the appended claims and their equivalents.

What is claimed is:

1. A water tank for an aquarium suitable for keeping jellyfish and other plankton life, comprising:
   a water container having a generally cylindrical shape with two parallel front panels and a side surface;
   a sealed chamber having a water inlet; and
   a diffuser providing a water passage from the sealed chamber to the water container, the diffuser having a plurality of parallel, elongated channels disposed along the side surface of the water container, the parallel, elongated channels being defined by the diffuser and the side surface and generating a plurality of parallel jet streams moving along the side surface of the water container.

2. The water tank of claim 1, wherein the side surface has a polygonal shape and is formed by a plurality of flat side panels disposed perpendicular to the front panels.

3. The water tank of claim 1, wherein the sealed chamber is located at a corner of the water tank adjacent the water container and is formed by a portion of the two front panels, a portion of the side surface, and one or more additional side panels disposed perpendicular to the front panels.

4. The water tank of claim 3, wherein the diffuser is disposed in a gap of the side surface between the sealed chamber and the water container.

5. The water tank of claim 1, wherein the channels are elongated in a first direction parallel to the side surface of the water container and the plurality of parallel jet streams move in the first direction.

6. A water tank for an aquarium suitable for keeping jellyfish and other plankton life, comprising:
   a water container having a generally cylindrical shape with two parallel front panels and a side surface;
   a sealed chamber having a water inlet; and
   a diffuser providing a water passage from the sealed chamber to the water container,
   wherein the diffuser is a stationary block disposed along a portion of the side surface of the water container, a surface of the block facing the side surface of the water container having a plurality of parallel channels formed thereon and each extending across the entire block, wherein the channels cooperate with the portion of the side surface of the water container to provide the water passage.

7. The water tank of claim 6, wherein the block extends in its length-wise direction from one front panel to the other, and wherein the parallel channels are evenly distributed along the length-wise direction of the block.

8. The water tank of claim 1, further comprising a baffle disposed in the sealed chamber in front of the water inlet.

9. The water tank of claim 1, wherein the water container defining an exit port at its top.

10. The water tank of claim 9, further comprising a screen covering the exit port.

11. The water tank of claim 9, further comprising:
   an overflow chamber; and
   a first riser extending between the two front panels and extending higher than the exit port to form a discharge space above the exit port that is separated from the overflow chamber by the first riser.

12. The water tank of claim 11, further comprising:
   a second riser extending between the two front panels, the second riser being located within the discharge space and extending higher than the exit port and lower than the first riser, the second riser forming an open trough; and
   one or more fluid channels for providing fluid communication between the open trough and the sealed chamber.

13. An aquarium system suitable for keeping jellyfish and other plankton life, comprising:
   a water tank including:
      an inlet;
      a discharge port;
      a water container having a generally cylindrical shape with two parallel front panels and a side surface;
      a sealed chamber connected to the inlet; and
      a diffuser providing a water passage from the sealed chamber to the water container, the diffuser having a plurality of parallel, elongated channels disposed along the side surface of the water container, the parallel, elongated channels being defined by the diffuser and the side surface and generating a plurality of parallel jet streams moving along the side surface of the water container;
   a water pump;
   a refrigeration unit;
   a water filter; and
   a foam fractionator,
   wherein the water pump, the refrigeration unit, the water filter and the foam fractionator are connected in series and connected to the discharge port and the inlet of the water tank by a drain and a return line, respectively.

14. The aquarium system of claim 13, wherein the channels are elongated in a first direction parallel to the side surface of the water container and the plurality of parallel jet streams move in the first direction.

\* \* \* \* \*